April 13, 1954 K. J. SYLVEST 2,674,810
APPARATUS FOR TREATING BULK MATERIALS
Filed April 26, 1952 2 Sheets-Sheet 1
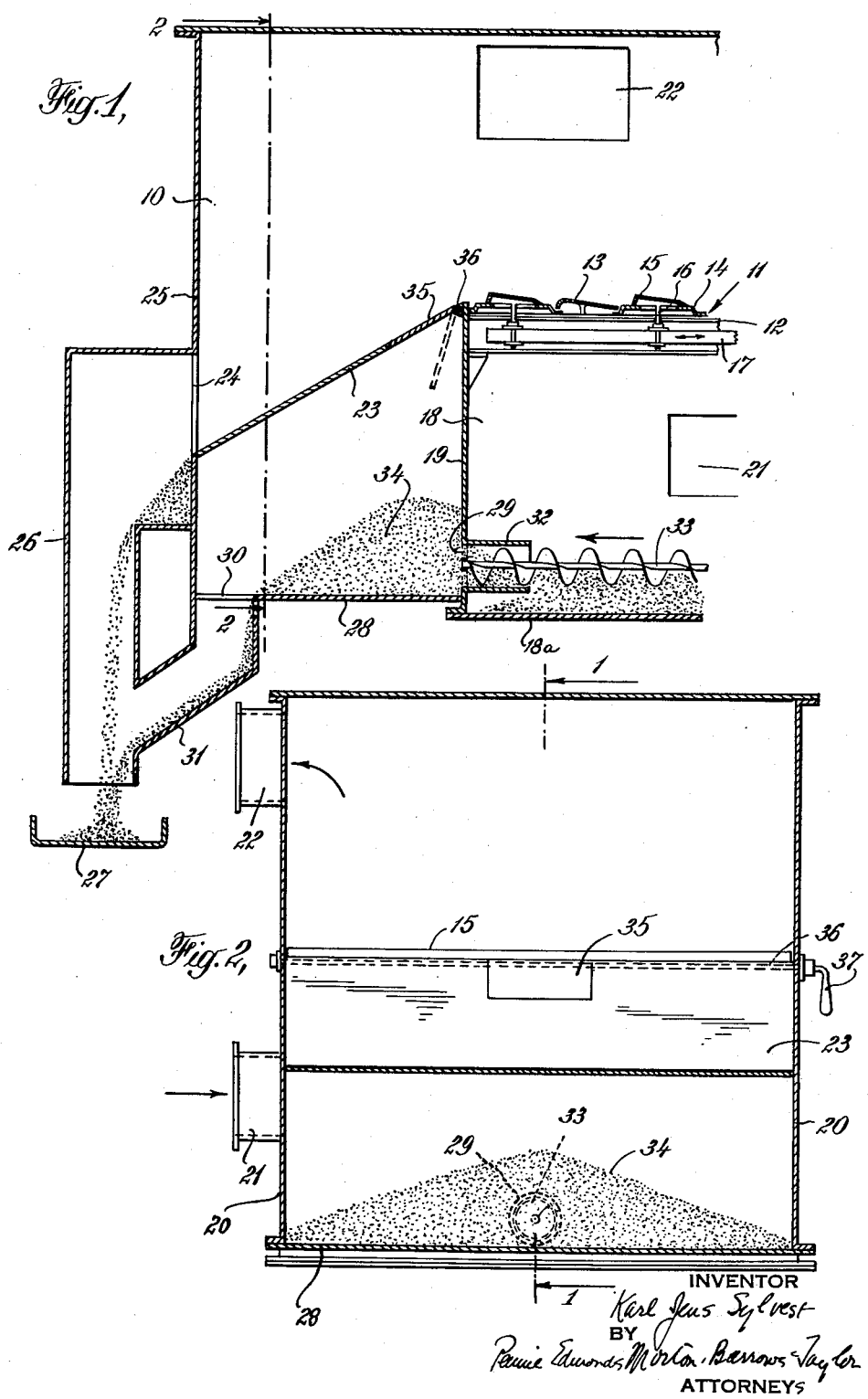
INVENTOR
Karl Jens Sylvest
BY
Pennie Edmonds, Morton, Barrows & Taylor
ATTORNEYS April 13, 1954 K. J. SYLVEST 2,674,810
APPARATUS FOR TREATING BULK MATERIALS
Filed April 26, 1952 2 Sheets-Sheet 2
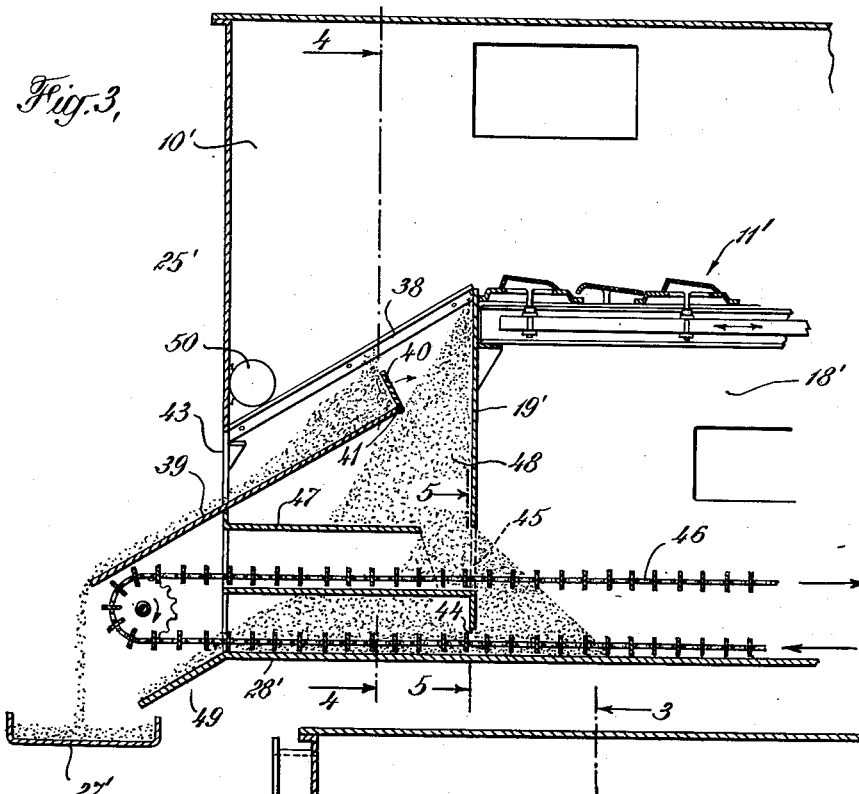
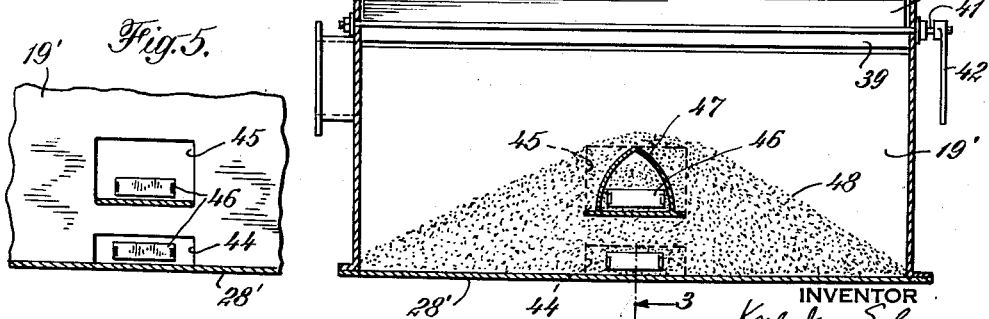

Patented Apr. 13, 1954

2,674,810

UNITED STATES PATENT OFFICE 2,674,810

APPARATUS FOR TREATING BULK MATERIALS

Karl Jens Sylvest, Copenhagen, Denmark, assignor to F. L. Smidth & Co., New York, N. Y., a corporation of New Jersey Application April 26, 1952, Serial No. 284,630

8 Claims. (Cl. 34—164)

This invention relates to the apparatus for the treatment of a material with a gas by passage of the gas through a layer of the material, while the latter is being advanced on a gas-permeable support. More particularly, the invention is concerned with a novel apparatus for the stated purpose, which is provided with means for removing material, which has fallen through openings in the support, without loss of the gas being supplied to the support from beneath to pass upward through the support and the layer of material thereon.

Apparatus of the kind referred to is particularly useful in the air cooling of cement clinker discharged from a kiln and may also be used in the cooling of other materials in bulk and in the burning or sintering of such materials as cement raw materials, lime, and ores. In such apparatus, the gas-permeable support may be a stretch of an endless gas-permeable conveyor or conveying means including a stationary perforated surface, either horizontal or inclined, along which the material is advanced by suitable means. The gas is usually supplied to a chamber, for which the conveying means forms the top wall, and the space above the conveying means is enclosed, so that the gas, which has passed through the material, can be collected and used for any desired purpose. In the operation of such apparatus, some of the material being treated inevitably passes through the conveying means into the gas chamber, no matter how carefully the conveying means are constructed, and the removal of such material from the gas chamber without escape of the gas presents difficulties.

The present invention is directed to the provision of apparatus as described for treating materials with gases, in which the removal of material, which has fallen into the gas chamber through the support, is accomplished without loss of the gas by simple effective means. In the new apparatus, the opening, through which the material is removed from the gas chamber, is sealed by the material, including that which is being removed and that which has been removed.

In apparatus constructed in accordance with the invention, the material being conveyed is discharged at the end of the gas chamber upon a sloping receiving member, below which is a floor lying close to the level of the bottom of the gas chamber. The receiving member extends from an end wall of the gas chamber adjacent the upper end thereof and the end wall has an opening just above the floor. Conveying means within the gas chamber advance material from the chamber through the opening to the floor and the material thus discharged through the opening forms a pile on the floor, which, with the material moving through the opening, seals the latter. As the pile accumulates on the floor, the material slides from the pile off the edge of the floor and into a chute or upon a sloping surface leading to a conveyor or other means for carrying the material to its destination. The material deposited upon the inclined receiving member slides down that member and is combined with the material removed from the bottom of the chamber. Preferably, the receiving member is provided with one or more openings, so that material may be dropped through the member upon the floor to build up or maintain the pile, which seals the opening.

For a better understanding of the invention, reference may be had to the accompanying drawings, in which:

Fig. 1 is a vertical sectional view through one form of the apparatus on the line 1—1 of Fig. 2;

Fig. 2 is a sectional view on the line 2—2 of Fig. 1;

Fig. 3 is a vertical sectional view through a modified form of the apparatus on the line 3—3 of Fig. 4; and Figs. 4 and 5 are sectional views on the lines 4—4 and 5—5, respectively, of Fig. 3.

The apparatus shown in the drawings is suitable for use in the cooling of cement clinker continuously discharged from a kiln and it comprises a main chamber 10 containing conveying means receiving the material and generally designated 11. The conveying means include a frame structure 12, on which stationary grate members 13 are mounted in spaced relation to extend transversely of the chamber. Plates 14 are mounted on the structure in alternation with the stationary grate members and a movable grate member 15 is mounted on each plate. Each movable grate member 15 is connected by a rod 16 passing through a slot in plate 14 to a reciprocating framework including longitudinal members 17. The stationary and movable grate members are formed with steep front surfaces and tops sloping at a low angle to the rear, so that as the movable members are reciprocated on their plates 14, they advance the material deposited on them and slide backward beneath the material, while the latter is held by the stationary grate members. The conveying means forms the top of a gas chamber 18 having a bottom 18a and imperforate end walls 19, of which only one is shown. The side walls of the gas chamber are formed by the walls 20 of the main chamber 10, within which the gas chamber is formed. The gas chamber is formed with an inlet 21 for introduction of air and the air passes upward through the conveying means and the material thereon and then escapes from the main chamber through outlet 22.

The main chamber 10 contains a receiving member 23 in the form of a plate, which extends downwardly at an incline from the top of end wall 19 of the gas chamber to an opening 24 in the end wall 25 of the main chamber The opening 24 leads into a chute 26 discharging upon a conveyor 27 of any suitable type. Beyond the end wall 19 of the gas chamber, the main chamber is provided with a floor 28 and the wall 19 is formed with an opening 29 just above the level of floor 28. The floor is provided with an opening 30 leading to a chute 31, which connects with chute 26.

A tube 32 is mounted on the inner surface of wall 19 of the gas chamber around opening 29 and one end of a conveyor screw 33 extends into the opening. The end of the shaft of the screw is mounted in a bearing support in the opening in any suitable way and the screw is driven by means not shown.

In the operation of the apparatus described, in the cooling of cement clinker, the clinker discharged from the kiln lands upon the conveying means 11 and is advanced by the reciprocating movement of the grate members 15. Air admitted to the gas chamber through opening 21 flows upwardly through the conveying means and the layer of material thereon and escapes from the main chamber 10 through the outlet 22. When the material has been advanced to the end of the gas chamber, it slides down the inclined receiving member 23 and falls through chute 26 to conveyor 27. Material, which drops through the conveying means into the gas chamber, is advanced through tube 32 and opening 29 by the conveyor screw 33 and collects to form a pile 34 on floor 28. As the pile builds up, it closes the opening 29 and forms a seal, which prevents escape of gas from the gas chamber. When the pile reaches sufficient size, the material slides from the pile through opening 30 and chute 31 to be combined with the material traveling through chute 26.

At the beginning of the use of the apparatus, it may be desirable to divert material from the receiving member 23 and cause it to fall on floor 28 to build up a pile, which will seal opening 29. For this purpose, the receiving member 23 may be provided with a section 35 mounted on a rod 36 provided with a handle 37. By operation of the handle, the section 35 may be swung to provide an opening through the receiving member, through which material may be discharged directly upon the floor to form a pile sealing the opening 29.

In the modified form of apparatus shown in Figs. 3–5, incl., the material to be treated is advanced by the conveying means 11' to the end of the gas chamber 18' and deposited on a receiving member made in two parts and comprising a sloping grid 38 made up of a plurality of parallel bars and a sloping plate 39 disposed beneath the grid. The plate has a flap 40 along itse edge adjacent wall 19' of the gas chamber and the flap is secured to a pivotally mounted rod 41 provided with a handle 42. When the flap 40 lies in the plane of plate 39, the free edge of the flap lies spaced from the wall 19', so that undersize material passing through grid 38 may fall to the bottom of the main chamber 10' adjacent the wall 19'. Adjustment of the flap 40 permits more or less of the material to fall to the bottom of the main chamber. Material passing through the grid and landing on plate 39 and its flap 40 passes out through an opening 43 in the end wall 25' of the main housing and is deposited upon a conveyor 27'.

The end wall 19' of the gas chamber is provided with an opening 44 adjacent the floor 28' of the main chamber 10' and with an upper opening 45. A drag chain conveyor 46 is mounted with its upper and lower horizontal stretches extending through the respective openings and the portion of the upper stretch of conveyor 46 lying outside the gas chamber within the main chamber is enclosed within a casing 47. The casing is cut away adjacent opening 45.

In the operation of the apparatus shown in Figs. 3–5, incl., some of the undersize material deposited on grid 38 drops through the grid and past the edge of flap 40 on plate 39 to accumulate in a pile 48 on floor 28' of the main chamber adjacent wall 19' of the gas chamber, the pile sealing openings 44 and 45. Material, which passes through conveying means 11' into the gas chamber, is removed by the lower stretch of conveyor 46 and the material is carried through the bottom of the pile and deposited upon the sloping plate 49 to travel down the plate and be deposited upon conveyor 27'. Some of the material in the pile is carried into the gas chamber by the upper stretch of conveyor 46 but, by enclosing the upper stretch of the conveyor in casing 47, more material is removed from the gas chamber by conveyor 46 than is brought back in. Any oversize material retained on grid 38 may be removed through an opening 50 in the wall of the main chamber 10', the opening being normally closed by a door.

The conveyor screw 33 is illustrated in Fig. 1 as having a single thread throughout its length. In practice, it is advantageous to provide the screw with a multiple thread adjacent the pile 34 and a single thread throughout the remainder of its length. In this manner, backward movement of the material along the conveyor is reduced and the wear per unit area of the screw thread and the power required to drive the screw are decreased. Only a few turns of the second thread are required for the purpose.

I claim:

1. In apparatus for the treatment of material with gases, the combination of a chamber, gas-permeable conveying means for the material, said means forming the top wall of the chamber, means for supplying gas to the chamber, a sloping member receiving material from the conveying means and extending from an end wall of the chamber, a flat imperforate floor beneath said member, said end wall having an opening above the floor, and means for removing through the end wall opening and depositing on the floor material, which has passed through the conveying means into the chamber, the material removed collecting in a pile on the floor and sealing the opening.

2. In apparatus for the treatment of material with gases, the combination of a chamber, gas-permeable conveying means for the material, said means forming the top wall of the chamber, means for supplying gas to the chamber, a sloping member receiving material from the conveying means and extending from an end wall of the chamber, a floor beneath said member, said end wall having an opening above the floor and the member having at least one opening through which material may fall upon the floor to form a pile closing said end wall opening, and means for removing through the end wall opening and depositing on the floor material, which has passed through the conveying means into the chamber, the material being removed being added to the pile.

3. In apparatus for the treatment of material with gases, the combination of a chamber, gas-permeable conveying means for the material, said means forming the top wall of the chamber, means for supplying gas to the chamber, a sloping member receiving material from the conveying means and extending from an end wall of the chamber, a flat imperforate floor beneath said member, said end wall having an opening above the floor, and a screw conveyor advancing material, which has entered the chamber through the conveying means, through said end wall opening, the material removed collecting on the floor in a pile sealing the opening.

4. In apparatus for the treatment of material with gases, the combination of a chamber, gas-permeable conveying means for the material, said means forming the top wall of the chamber, means for supplying gas to the chamber, a sloping member receiving material from the conveying means and extending from an end wall of the chamber, a flat imperforate floor beneath said member, said end wall having an opening above the floor, a tube leading inward into the chamber from said end wall around the opening, and a screw conveyor within the tube operating to advance through the tube and discharge through the opening material, which has entered the chamber through the conveying means, the material discharged collecting on the floor in a pile sealing the opening.

5. In apparatus for the treatment of material with gases, the combination of a chamber, gas-permeable conveying means for the material, said means forming the top wall of the chamber, means for supplying gas to the chamber, a sloping member receiving material from the conveying means and extending from an end wall of the chamber, a floor beneath said member, said end wall having an opening above the floor and the member having at least one opening through which material may fall upon the floor to form a pile closing said end wall opening, controllable means for restricting the opening, and means for removing through the end wall opening material, which has passed through the conveying means into the chamber, the material removed collecting on the floor in a pile sealing the end wall opening.

6. In apparatus for the treatment for material with gases, the combination of a chamber, gas-permeable conveying means for the material, said means forming the top wall of the chamber, means for supplying gas to the chamber, a sloping perforate member receiving material from the conveying means and extending from an end wall of the chamber, an imperforate receiving member beneath the perforate member and spaced from the end wall, a floor beneath the members, part of the undersize material, which passes through the perforate member, landing upon the imperforate member and the remainder landing upon the floor to form a pile in contact with the end wall, said end wall having an opening adjacent the floor, and means for removing through the end wall opening material, which has entered the chamber through the conveying means, the material removed being added to the pile and the pile sealing the end wall opening.

7. In apparatus for the treatment of material with gases, the combination of a chamber, gas-permeable conveying means for the material, said means forming the top wall of the chamber, means for supplying gas to the chamber, a sloping perforate member receiving material from the conveying means and extending from an end wall of the chamber, an imperforate receiving member beneath the perforate member and spaced from the end wall, a floor beneath the members, part of the undersize material, which passes through the perforate member, landing upon the imperforate member and the remainder landing upon the floor to form a pile in contact with the end wall, said end wall having an opening adjacent the floor and a second opening above the first, an endless conveyor having upper and lower horizontal stretches extending through respective end wall openings, the conveyor removing through the lower end wall opening material, which has entered the chamber through the conveying means, the material removed being added to the pile and the pile sealing said end wall openings, and a casing enclosing the upper stretch of the conveyor outside the chamber, the casing having an opening leading to the upper end wall opening.

8. In apparatus for the treatment of material with gases, the combination of a chamber, gas-permeable conveying means for the material, said means including a perforated support forming the top wall of the chamber and means for advancing material along the support, means for supplying gas to the chamber, a sloping member receiving material from the conveying means and extending from an end wall of the chamber, a flat imperforate floor beneath said member, said end wall having an opening above the floor, and means for removing through the end wall opening and depositing on the floor material, which has passed through the conveying means into the chamber, the material removed collecting in a pile on the floor and sealing the opening.

References Cited in the file of this patent

UNITED STATES PATENTS

| Number | Name | Date |
|--------|------|------|
| 417,273 | Parkinson | Dec. 17, 1889 |
| 1,758,496 | Boynton | May 13, 1930 |
| 2,014,249 | Fletcher | Sept. 10, 1935 |
| 2,320,755 | Smith | June 1, 1943 |
| 2,346,176 | McAleer | Apr. 11, 1944 |